(12) United States Patent
Lin

(10) Patent No.: US 7,596,424 B2
(45) Date of Patent: Sep. 29, 2009

(54) MACHINING CONDITION DETERMINING SYSTEM AND METHOD FOR SINKER ELECTRIC DISCHARGE MACHINING APPARATUS

(75) Inventor: Lingshi Lin, Kanagawa (JP)

(73) Assignee: Sodick Co., Ltd., Yokohama, Kanagawa (JP)

( * ) Notice: Subject to any disclaimer, the term of this patent is extended or adjusted under 35 U.S.C. 154(b) by 138 days.

(21) Appl. No.: 11/822,919

(22) Filed: Jul. 11, 2007

(65) Prior Publication Data
US 2008/0015729 A1 Jan. 17, 2008

(30) Foreign Application Priority Data
Jul. 13, 2006 (JP) ............... 2006-192519

(51) Int. Cl.
  *G06F 19/00* (2006.01)
  *B23H 1/00* (2006.01)
  *B23H 7/14* (2006.01)
(52) U.S. Cl. .................. 700/162; 219/69.13; 219/69.17
(58) Field of Classification Search ......... 700/159–162; 219/69.1–70
See application file for complete search history.

(56) References Cited

U.S. PATENT DOCUMENTS

| | | | |
|---|---|---|---|
| 5,224,048 A | 6/1993 | Ohba et al. | |
| 5,756,955 A | 5/1998 | Goto et al. | |
| 6,791,055 B1 | 9/2004 | Katougi | |
| 6,907,311 B2 | 6/2005 | Sendai et al. | |
| 7,202,438 B2* | 4/2007 | Asai et al. | 219/69.13 |
| 7,259,347 B2* | 8/2007 | Sasaki et al. | 219/69.13 |
| 7,428,444 B2* | 9/2008 | Gasparraj | 700/162 |
| 2006/0065546 A1* | 3/2006 | Curodeau | 205/640 |

FOREIGN PATENT DOCUMENTS

| | | |
|---|---|---|
| JP | 3-264219 | 11/1991 |
| JP | 2003-291032 | 10/2003 |

\* cited by examiner

*Primary Examiner*—M. N. Von Buhr
(74) *Attorney, Agent, or Firm*—McDermott Will & Emery LLP

(57) ABSTRACT

A method of determining machining condition for a sinker electric discharge machining apparatus in which a tool electrode is advanced along a z-axis to machine the workpiece, comprises the steps of: (a) producing a cavity model (D) as a solid model of part of the tool electrode; (b) tessellating the cavity model into a mesh of triangle each of triangles having an ordered set of vertices and having an orientation defined by the ordering of the vertices; (c) projecting the triangles on an xy plane surface; (d) summing up areas (S) of the projected triangles having the same orientation to calculate a machining area; and (e) determining machining conditions based on the machining area.

10 Claims, 4 Drawing Sheets

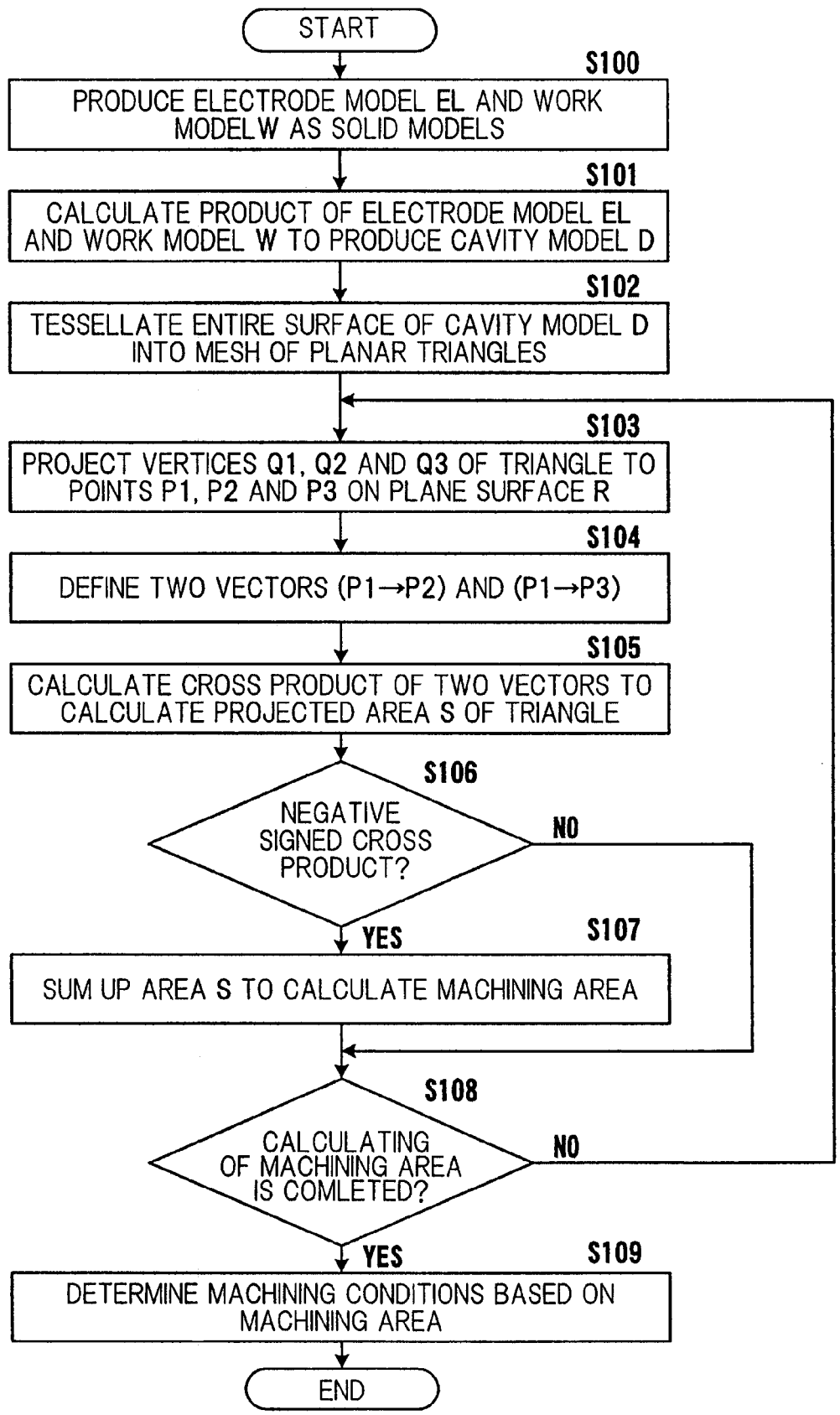

12345678901234567890# MACHINING CONDITION DETERMINING SYSTEM AND METHOD FOR SINKER ELECTRIC DISCHARGE MACHINING APPARATUS

BACKGROUND OF THE INVENTION

1. Field of the Invention

The present invention relates to a sinker electric discharge machining apparatus for forming in the workpiece a cavity which is complementary in shape to a tool electrode by applying a series of current pulses. In particular, the present invention relates to a machining condition determining system for determining machining conditions.

2. Description of the Related Art

In general, a tool electrode for sinker electric discharge machining is advanced along an axis of advancement to shape the workpiece. The axis of advancement is mostly a z-axis. In preparation for sinker electric discharge machining, a tool electrode is designed according to a three-dimensional geometry of the cavity being formed. Then, optimum machining conditions are determined in consideration of a three-dimensional geometry of the cavity, material of the tool electrode and workpiece and etc. The setting of the machining conditions are included in an NC program for electric discharge machining. The machining conditions are, for example, current peak, on-time and off-time of current pulse to be supplied to a tool electrode. Current peak is a critical machining condition which determines material removal rate and surface roughness. In general, a machining condition determining system considers machining area or active area of the tool electrode to determine current peak. The machining area is obtained by projecting the machining surface of the tool electrode downward on a plane perpendicular to the axis of advancement. If a column-shaped tool electrode is used, the machining area is an area of the base. As the machining progresses and the tool electrode advances further in the negative direction of z-axis, the machining area may be changed.

With the spread of CAD/CAM (Computer Aided Design/Computer Aided Manufacture), a CAD device now produces three-dimensional geometries of the cavity and tool electrode, and a CAM device automatically produces an NC program using such 3D geometry data. The 3D geometry data of the tool electrode or cavity is also used to accurately calculate the machining area.

Japanese Laid-open patent application 2003-291032 discloses a CAD device which produces a three-dimensional solid model of the tool electrode, and prepares a surface model of the tool electrode from the solid model. Machining area is calculated from the surface model for a plurality of depth positions of the tool electrode using an iterative method such as Newton-Raphson method. The optimum machining conditions are determined based on the machining area.

In order to obtain the optimum machining conditions, accurate calculation of the machining area is needed. Machining area calculation methods depend on a three-dimensional geometry of the tool electrode. Therefore, a conventional machining condition determining system must store a plurality of computation methods for circular cone, cylindrical column and etc.

SUMMARY OF THE INVENTION

An object of the present invention is to provide a machining condition determining system and method which accurately calculates machining area with a common way regardless of a three-dimensional geometry of a tool electrode.

Another object of the present invention is to provide a machining condition determining system and method which accurately calculates machining area even if a tool electrode has a complicated three-dimensional geometry.

According to one aspect of the present invention, a machining condition determining system for a sinker electric discharge machining apparatus in which a tool electrode is advanced along an axis of advancement to machine the workpiece comprises:

a cavity model producing means (22) for producing a cavity model (D) as a solid model of part of the tool electrode;

a tessellating means (23) for tessellating the cavity model into a mesh of polygons each of the polygons having an ordered set of vertices and having an orientation defined by the ordering of the vertices;

a projected area calculating means (32) for projecting the polygons on a plane surface (R) perpendicular to the axis of advancement and summing up areas of the projected polygons having the same orientation to calculate a machining area; and a machining condition determining means (33) for determining machining conditions based on the machining area.

Preferably, the mesh of polygons may be a mesh of triangles.

The machining conditions may include current peak of current pulse to be supplied to the tool electrode.

According to another aspect of the present invention, a method of determining machining condition for a sinker electric discharge machining apparatus in which a tool electrode is advanced along an axis of advancement to machine the workpiece, comprises the steps of:

(a) producing a cavity model as a solid model of part of the tool electrode;

(b) tessellating the cavity model into a mesh of polygons each of polygons having an ordered set of vertices and having an orientation defined by the ordering of the vertices;

(c) projecting the polygons on a plane surface perpendicular to the axis of advancement;

(d) summing up areas of the projected polygons having the same orientation to calculate a machining area; and (e) determining machining conditions based on the machining area.

According to yet another aspect of the present invention, a method of determining machining condition for a sinker electric discharge machining apparatus in which a tool electrode is advanced along an axis of advancement to machine the workpiece, comprises the steps of:

(a) producing a cavity model as a solid model of part of the tool electrode;

(b) tessellating the cavity model into a mesh of triangles each of the triangle having first, second and third vertices in order and having an orientation defined by the ordering of the vertices;

(c) projecting the first, second and third vertices (Q1,Q2, Q3) to first, second and third points (P1,P2,P3) on a plane surface (R) perpendicular to the axis of advancement;

(d) defining a first vector extending from the first point to the second point and a second vector extending from the first point to the third point;

(e) calculating the signed cross product of the first vector and the second vector;

(f) summing up the magnitude of the cross products having the same sign to calculate a machining area; and (g) determining machining conditions based on the machining area.

BRIEF DESCRIPTION OF THE DRAWINGS

FIG. 7 is a flowchart illustrating a machining condition determining process of the NC data producing system.

PREFERRED EMBODIMENT OF THE INVENTION

A machining condition determining system of the present invention will now be described with reference to the drawings.

Figure 1:
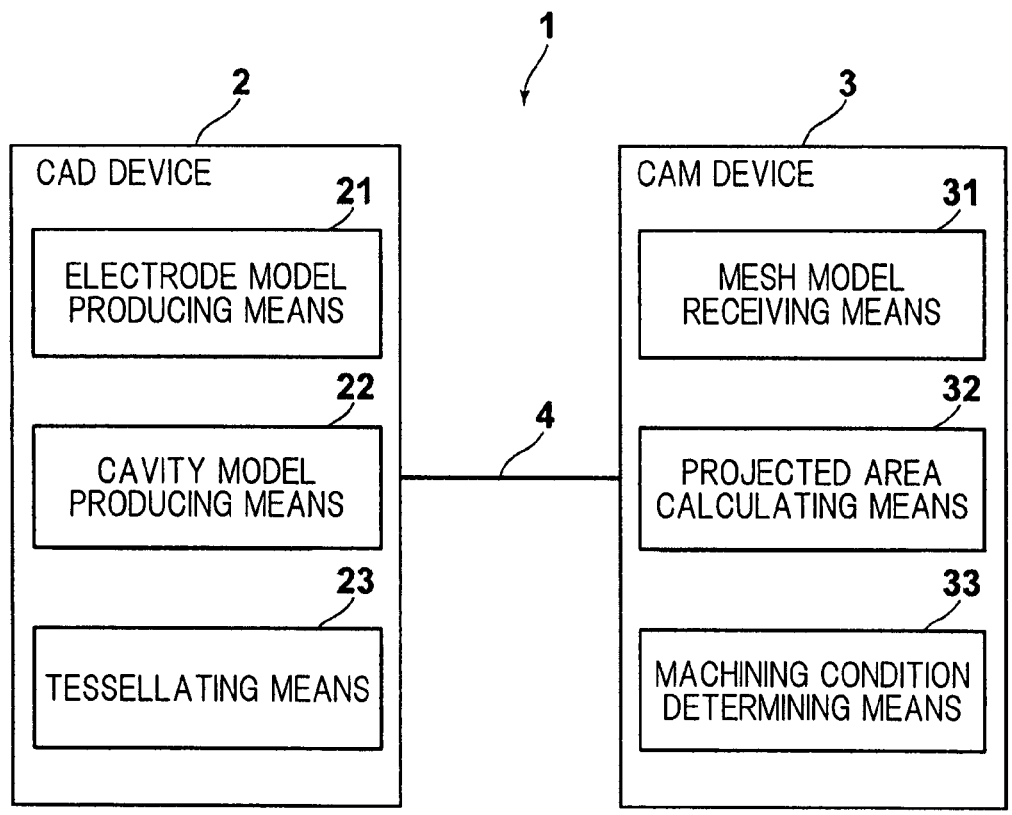
FIG. 1 is a block diagram illustrating an NC data producing system of the present invention.

As illustrated in FIG. 1, an NC data producing system 1 includes a CAD device 2, a CAM device 3 and a network 4 connecting the CAD device 2 and CAM device 3. The CAD device 2 is provided for designing a tool electrode as well as a cavity to be formed in the workpiece. The CAM device 3 receives information on a geometry of the tool electrode, a position of the workpiece and etc., and produces an NC program for machining the workpiece. The CAD device 2 and CAM device 3 are implemented by running CAD program and CAM program on a computer such as a personal computer. The CAD and CAM programs are saved to secondary storage of the computer from a data storage medium such as a CD-ROM. These programs may be obtained over a network such as the Internet. A variety of networks such as LAN, WAN, Internet and etc. may be used.

The CAD device 2 includes an electrode model producing means 21, a cavity model producing means 22 and a tessellating means 23. The electrode model producing means 21 receives an operator's data input and produces an electrode model EL as a solid model of a tool electrode, and a work model W as a solid model of a workpiece to be shaped, as illustrated in FIG. 2.

In general, the workpiece is fixed parallel to an XY plane on an appropriate table. During electric discharge machining, a tool electrode is positioned extremely close to the workpiece with a gap of a few μm to a few tens of μm. A series of current pulses are supplied to the tool electrode to generate electric discharges at the microscopic gap at a high frequency. As the electric discharges repeatedly remove microscopic amounts of the workpiece material, the tool electrode is further advanced toward the workpiece in the direction of the z-axis.

Figure 2:
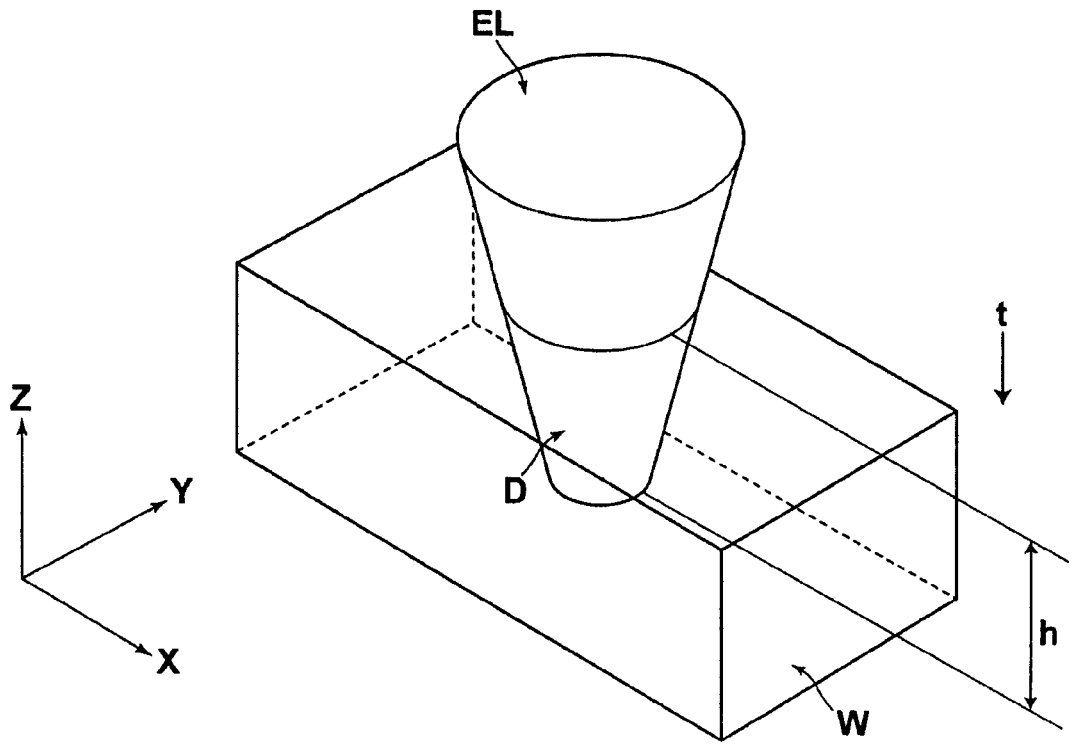
FIG. 2 illustrates solid models of the tool electrode and workpiece.

The cavity model producing means 22 causes the electrode model EL to advance to a predetermined depth position h in the vertical downward direction t, as shown in FIG. 2. The direction t is a negative Z-axis direction. The cavity model producing means 22 calculates the product of the electrode model EL and work model W to produce a cavity model D as a solid model of part of the tool electrode. This part of the tool electrode is almost equals to a cavity to be formed in the work. The cavity is complementary in shape to part of the tool electrode and may be a hole, recess and groove depending on the shape of the tool electrode.

Figure 3:
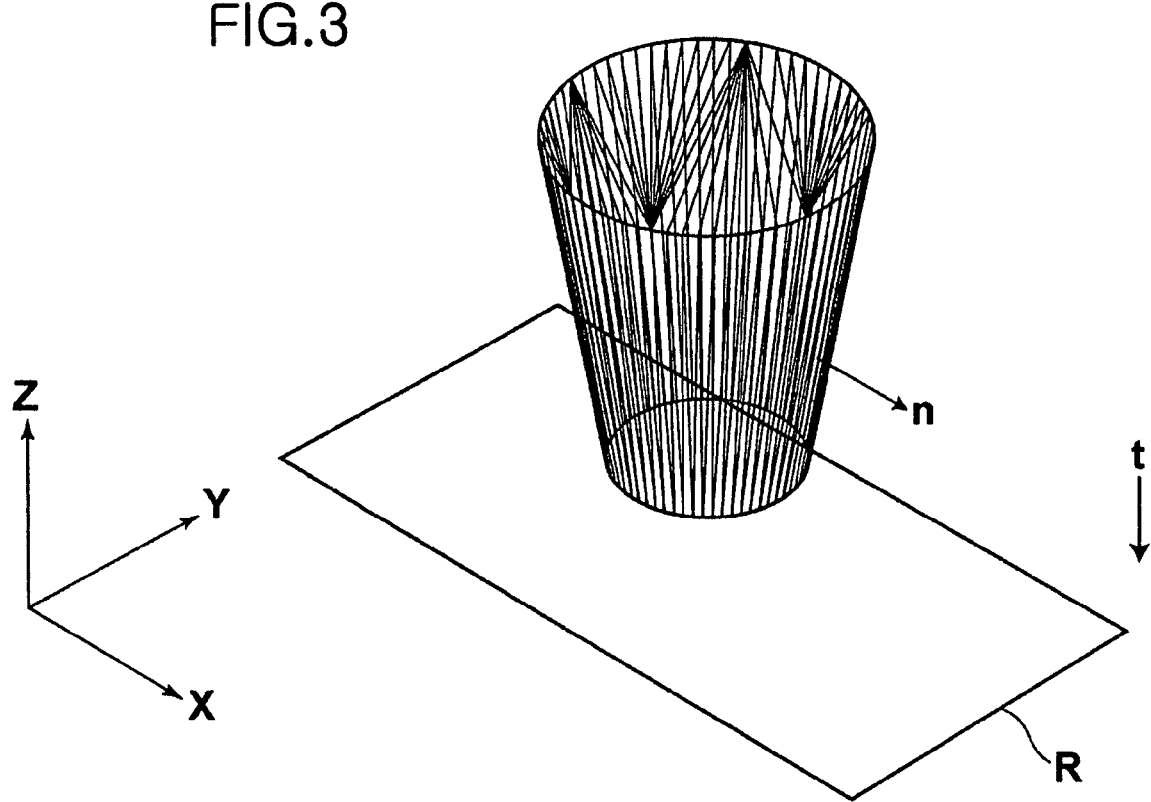
FIG. 3 illustrates a triangle mesh representation of the cavity model of FIG. 2.
Figure 4:
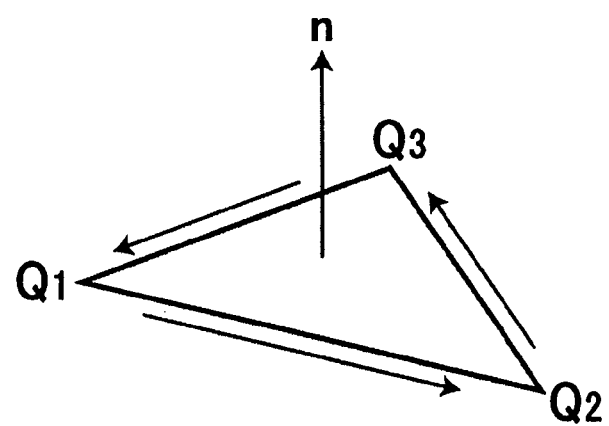
FIG. 4 illustrates a planar triangle of the mesh.

The tessellating means 23 tessellates the entire surface of the cavity model D into a mesh of simple planar polygons such as triangles to convert the cavity model D to a mesh model, as illustrated in FIG. 3. Each of the triangles faces outwards and a normal vector n represents its orientation. As illustrated in FIG. 4, each of the triangles has an ordered set of vertices Q1, Q2 and Q3 and its orientation is defined by the ordering of the vertices. When the vertices Q1, Q2 and Q3 are ordered in a counter-clockwise fashion, the triangle has a positive orientation.

The CAM device 3 includes a mesh model receiving means 31, a projected area calculating means 32 and a machining condition determining means 33. The mesh model receiving means 31 receives the mesh model with the mesh of planar triangles for the cavity from the CAD device 2 through the network 4. The projected area calculating means 32 projects each planar triangle to a plane surface R to calculate machining area. The plane surface R is perpendicular to the z-axis and may be an xy plane.

Figure 5:
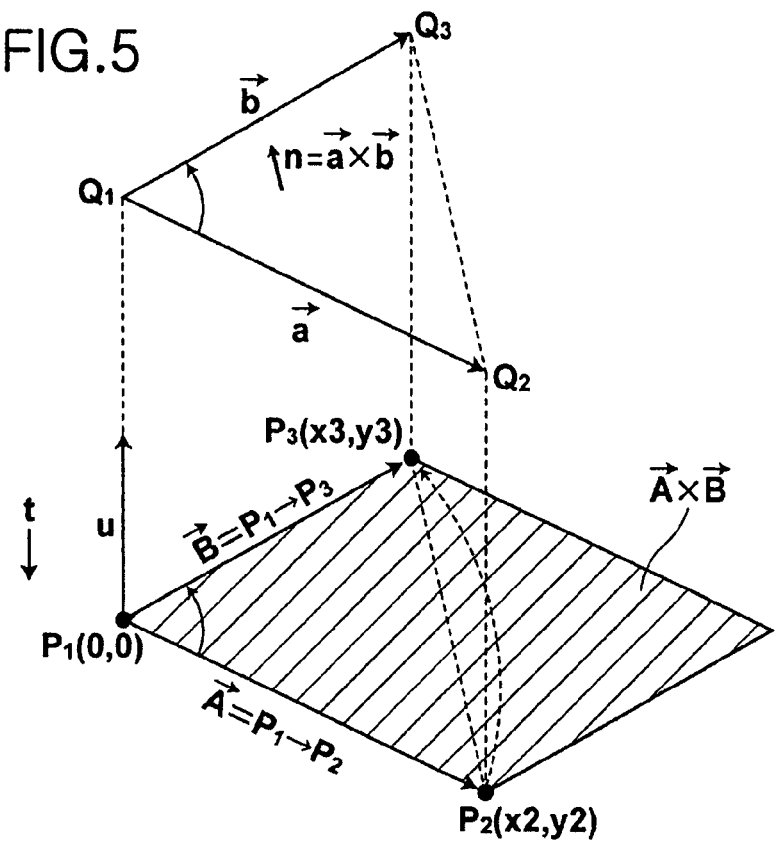
FIG. 5 illustrates the projection of the triangle.
Figure 6:
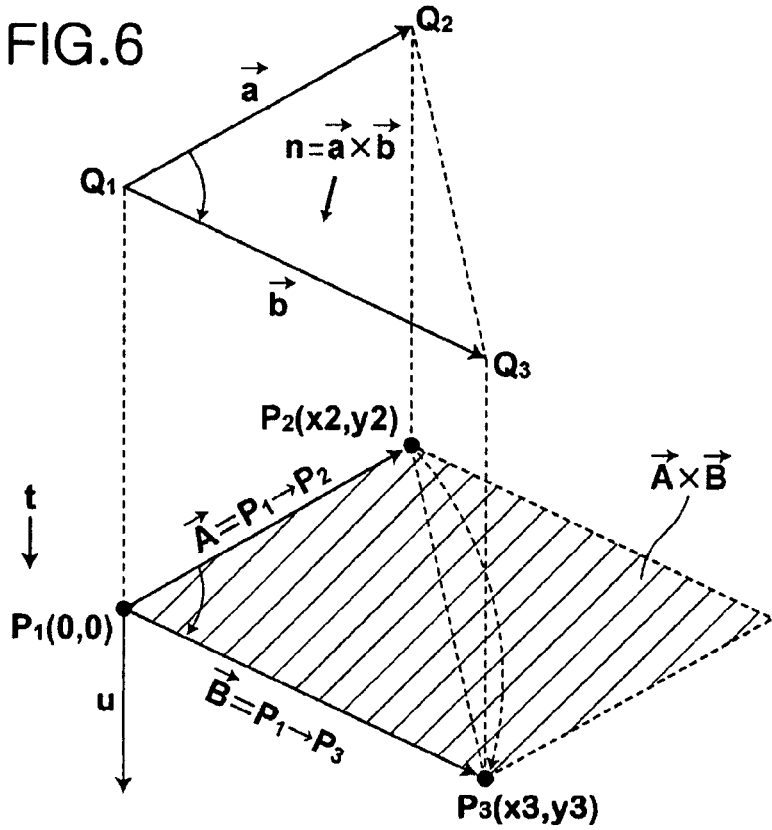
FIG. 6 illustrates the projection of the triangle.

As illustrated in FIGS. 5 and 6, the CAM device 3 projects each planar triangle to a plane surface R which is perpendicular to the axis of advancement of the tool electrode. The vertices Q1, Q2 and Q3 of a planar triangle are projected downward to respective points P1, P2 and P3 on a plane surface R. Actually a z-coordinate is removed from xyz coordinates of each vertex. The projected area calculating means 32 defines two vectors $\vec{A}$ and $\vec{B}$. The vector $\vec{A}$ points from P1 (0,0) to P2 (x2,y2) and a vector $\vec{B}$ points from P1 (0,0) to P3 (x3,y3). The magnitude of the signed cross product $\vec{A} \times \vec{A}$ of the two vectors is the area of a shaded parallelogram in FIGS. 5 and 6. Therefore, the area S of the projected triangle P1P2P3 is one-half the magnitude of the cross product $\vec{A} \times \vec{B}$, as represented by the following equation:

$$S = \frac{1}{2}\vec{A} \times \vec{B} = \frac{1}{2}\begin{pmatrix} x_2 & x_3 \\ y_2 & y_3 \end{pmatrix} = \frac{1}{2}(x_2 \cdot y_3 - x_3 \cdot y_2) \quad (1)$$

The orientation u of the projected triangle P1P2P3 depends on the sign of the area S. If the projected area S is positive (S>0), the triangle P1P2P3 faces upward, as illustrated in FIG. 5. If the projected area S is equal to zero (S=0), the triangle P1P2P3 is perpendicular to the axis of advancement. If the area S is negative (S<0), the triangle P1P2P3 faces downward, as illustrated in FIG. 6. The projected area calculating means 32 calculates the absolute value of the sum of the areas of the downward projected triangles to determine the machining area. Alternatively, the projected area calculating means 32 may calculate the sum of the areas of the upward projected triangles.

Material removal rate, surface roughness, shape accuracy and electrode wear rate depends on such machining conditions. The machining condition determining means 33 stores a table in which machining conditions such as current peak, on-time and off-time of current pulse are related to the machining area, shape accuracy and surface roughness. The machining condition determining means 33 determines the machining conditions based on the machining area as well as required shape accuracy and surface roughness.

With reference to FIG. 7, the machining condition determining process of the NC data producing system 1 will be described in detail.

At step S100, the CAD device 2 produces the electrode model EL and the work model W as solid models. At step S101, the CAD device 2 calculates the product of the electrode model EL and work model W to produce the cavity model D as a solid model. At step S102, the CAD device 2 tessellates the entire surface of the cavity model D into a mesh of planar triangles to generate a mesh model. The mesh model is transferred to the CAM device 3 from the CAD device 2 through the network 4.

The CAM device 3 projects the vertices Q1, Q2 and Q3 of the triangles to respective points P1, P2 and P3 on a plane surface R which is perpendicular to the axis of advancement, at step S103. At step S104, the CAM device 3 defines a vector $\vec{A}$ extending from the first point P1 to the second point P2 and a vector $\vec{B}$ extending from the first point P1 to the third point P3. At step S105, the signed cross product $\vec{A} \times \vec{B}$ of the two vectors $\vec{A}$ and $\vec{B}$ is calculated. If the cross product $\vec{A} \times \vec{B}$ is negative, at step S106, the process proceeds to step S107. Otherwise, the process skips to step S108.

The area S of the projected triangle defined by the ordered points P1, P2 and P3 is calculated using the equation (1). At the step S107, the CAM device 3 sums up the area S of the projected triangle to calculate a machining area. If the CAM device 3 projects all of the mesh of triangles and sums up the areas S of the projected triangles, at step S108, a machining area is obtained and the process proceeds to step S109. At the step S109, machining conditions such as current peak of current pulse is determined.

The present invention is not intended to be limited to the disclosed form. It is clear that many improvements and variations are possible with reference to the above description. The illustrated embodiment was selected to explain the essence and practical application of the invention. The scope of the invention is defined by the attached claims.

The invention claimed is:

1. A machining condition determining system for a sinker electric discharge machining apparatus in which a tool electrode is advanced along an axis of advancement to machine the workpiece comprising:
    a cavity model producing means for producing a cavity model as a solid model of part of the tool electrode;
    a tessellating means for tessellating the cavity model into a mesh of polygons each of the polygons having an ordered set of vertices and having an orientation defined by the ordering of the vertices;
    a projected area calculating means for projecting the polygons on a plane surface perpendicular to the axis of advancement and summing up areas of the projected polygons having the same orientation to calculate a machining area; and
    a machining condition determining means for determining machining conditions based on the machining area.

2. The machining condition determining system of claim 1, wherein the mesh of polygons is a mesh of triangles.

3. The machining condition determining system of claim 1, wherein the projected area calculating means include a means summing up areas of the projected polygons having a negative orientation.

4. The machining condition determining system of claim 1, further comprising an electrode model producing means for producing an electrode model as a solid model of a tool electrode, and a work model as a solid model of the workpiece, and wherein the cavity model producing means calculates the product of the electrode model and work model.

5. The machining condition determining system of claim 1, wherein machining conditions includes current peak of current pulse to be supplied to the tool electrode.

6. A method of determining machining condition for a sinker electric discharge machining apparatus in which a tool electrode is advanced along an axis of advancement to machine the workpiece, comprising the steps of:
    (a) producing a cavity model as a solid model of part of the tool electrode;
    (b) tessellating the cavity model into a mesh of polygons each of polygons having an ordered set of vertices and having an orientation defined by the ordering of the vertices;
    (c) projecting the polygons on a plane surface perpendicular to the axis of advancement;
    (d) summing up areas of the projected polygons having the same orientation to calculate a machining area; and
    (e) determining machining conditions based on the machining area.

7. The method of claim 6, further comprising a step of producing an electrode model as a solid model of a tool electrode and a work model as a solid model of the workpiece, and wherein the step (a) includes a step of calculating the product of the electrode model and work model.

8. A method of determining machining condition for a sinker electric discharge machining apparatus in which a tool electrode is advanced along an axis of advancement to machine the workpiece, comprising the steps of:
    (a) producing a cavity model as a solid model of part of the tool electrode;
    (b) tessellating the cavity model into a mesh of triangles each of the triangle having first, second and third vertices in order and having an orientation defined by the ordering of the vertices;
    (c) projecting the first, second and third vertices to first, second and third points on a plane surface perpendicular to the axis of advancement;
    (d) defining a first vector extending from the first point to the second point and a second vector extending from the first point to the third point;
    (e) calculating the signed cross product of the first vector and the second vector;
    (f) summing up the magnitude of the cross products having the same sign to calculate a machining area; and
    (g) determining machining conditions based on the machining area.

9. The method of claim 8, wherein the step (f) includes a step of summing up the magnitude of the negative signed cross products to calculate a machining area a cross product.

10. The machining condition determining system of claim 8, wherein machining conditions includes current peak of current pulse to be supplied to the tool electrode.

* * * * *